United States Patent
Liu

(10) Patent No.: US 8,957,710 B2
(45) Date of Patent: Feb. 17, 2015

(54) START-UP CIRCUIT

(75) Inventor: Ping Lin Liu, Jhubei (TW)

(73) Assignee: Sitronix Technology Corp, Jhubei, Hsinchu County (TW)

( * ) Notice: Subject to any disclaimer, the term of this patent is extended or adjusted under 35 U.S.C. 154(b) by 295 days.

(21) Appl. No.: 13/556,716

(22) Filed: Jul. 24, 2012

(65) Prior Publication Data

US 2013/0027008 A1    Jan. 31, 2013

(30) Foreign Application Priority Data

Jul. 25, 2011    (TW) .............................. 100126215 A

(51) Int. Cl.
*H03K 17/22*    (2006.01)
*G06F 1/26*    (2006.01)
*G09G 3/36*    (2006.01)

(52) U.S. Cl.
CPC ................ *G06F 1/26* (2013.01); *G09G 3/3696* (2013.01); *G09G 2330/021* (2013.01); *G09G 2330/026* (2013.01); *G09G 2330/027* (2013.01); *Y10S 323/901* (2013.01)
USPC ............................ 327/143; 323/901; 327/198

(58) Field of Classification Search
CPC ........... H02M 1/36; H03K 7/22; H03K 7/223; G06F 1/24
USPC ...................... 323/901; 327/142–143, 50, 198
See application file for complete search history.

(56) References Cited

U.S. PATENT DOCUMENTS

| 7,612,588 B2 * | 11/2009 | Kimura ......................... 327/143 |
| 2010/0073042 A1 * | 3/2010 | Choi ............................. 327/143 |

FOREIGN PATENT DOCUMENTS

| TW | 200522067 | 7/2005 |
| TW | 200712861 | 4/2007 |
| TW | 200818670 | 4/2008 |
| TW | 200947845 | 11/2009 |
| TW | 201044758 | 12/2010 |
| TW | 201119169 | 6/2011 |

* cited by examiner

*Primary Examiner* — Harry Behm
(74) *Attorney, Agent, or Firm* — Muncy, Geissler, Olds & Lowe, P.C.

(57) ABSTRACT

The present relates to a start-up circuit, which is used for starting up a variable power supply circuit, which comprises a detection circuit and a transition circuit. The detection circuit is used for detecting an output voltage of the variable power supply and producing a detection signal. The transition circuit is coupled to the detection circuit. It transits the level of the detection signal and produces a control signal for starting up or cutting off the variable power supply. Thereby, the problem of incapability in transition can be avoided as well as achieving the purpose of low power consumption.

8 Claims, 8 Drawing Sheets

START-UP CIRCUIT

FIELD OF THE INVENTION

The present invention relates generally to a start-up circuit, and particularly to a start-up circuit applicable to a driving circuit for outputting variable voltage levels.

BACKGROUND OF THE INVENTION

Thanks to the prosperous progress of technologies at present time, novel information products are developed and introduced, satisfying the various needs of many people. Early displays are mainly cathode ray tubes (CRTs). Due to their huge size and power consumption as well as radiation production, which is harmful to long-term users of the displays, modern displays in the market are gradually replaced by liquid crystal displays (LCDs). LCDs have the advantages of small size and light weight, low radiation, and low power consumption. Thereby, they have become the mainstream in the market.

In addition, current small-sized TFTLCD driver ICs are developing towards zero-capacitor driving, which means the original external capacitor is now built-in inside the driver IC. The biggest problem of this method is that the required charges for the panel of LCD cannot completely supplied by the built-in capacitor of the IC. For solving this problem, if a charge pump is added to each source driver, the panel can be used as a voltage stabilizing capacitor. The charges required by the panel to supplied to the panel by the charge pump via the operational amplifier (OPA) in the source driver. Nonetheless, this method has a drawback that the static current of the OPA in the source driver cannot be excess, which is approximately less than 1 uA. This is because the charge pump has no stabilizing capacitor for supplying excessive static current. If the OPA in the source driver has to maintain sufficiently small static current, its output stage will face the problem of inability in driving high or driving low voltage. There are many methods to solve this problem, for example, modifying the architecture of OPA to meet the required static current, or using a pre-charge switch and a comparator to achieve the pre-charge function. If the latter method is adopted, because the signal to be compared is the signal of its own highest power supply, the problem of incapability in high gray-scale transition might occur.

Accordingly, the present invention provides a novel start-up circuit, which can prevent the problem of incapability in high gray-scale transition as well as achieving a driving model of low power consumption and fast charging. The problems described can thus be solved.

SUMMARY

An objective of the present invention to provide a start-up circuit, which uses a detection circuit and a transition circuit for prevent the problem of incapability in transition as well as achieving the purpose of low power consumption.

Another objective of the present invention is to provide a start-up circuit, which is applied to a driving circuit. By using a detection circuit and a transition circuit for achieving the purpose of fast charging.

Still another objective of the present invention is to provide a start-up circuit, which uses a latch circuit for improving the stability of the start-up circuit.

The start-up circuit according to the present invention is used for starting up a variable power supply circuit, which comprises a detection circuit and a transition circuit. The detection circuit is used for detecting an output voltage of the variable power supply and producing a detection signal. The transition circuit is coupled to the detection circuit. It transits the level of the detection signal and produces a control signal for starting up or cutting off the variable power supply. Thereby, the problem of incapability in high gray-scale transition can be avoided as well as achieving the purpose of lower power consumption. Besides, the start-up circuit according to the present invention can be applied to a driving circuit. By using the detection circuit and the transition circuit, a pre-charge switch is activated for assisting the driving circuit to charge and thus achieving the purpose of fast charging.

Moreover, the present invention further comprises a latch circuit, which is coupled between the detection circuit and the transition circuit for latching the detection signal. Hence, the purpose of improving the stability of the start-up circuit can be achieved.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
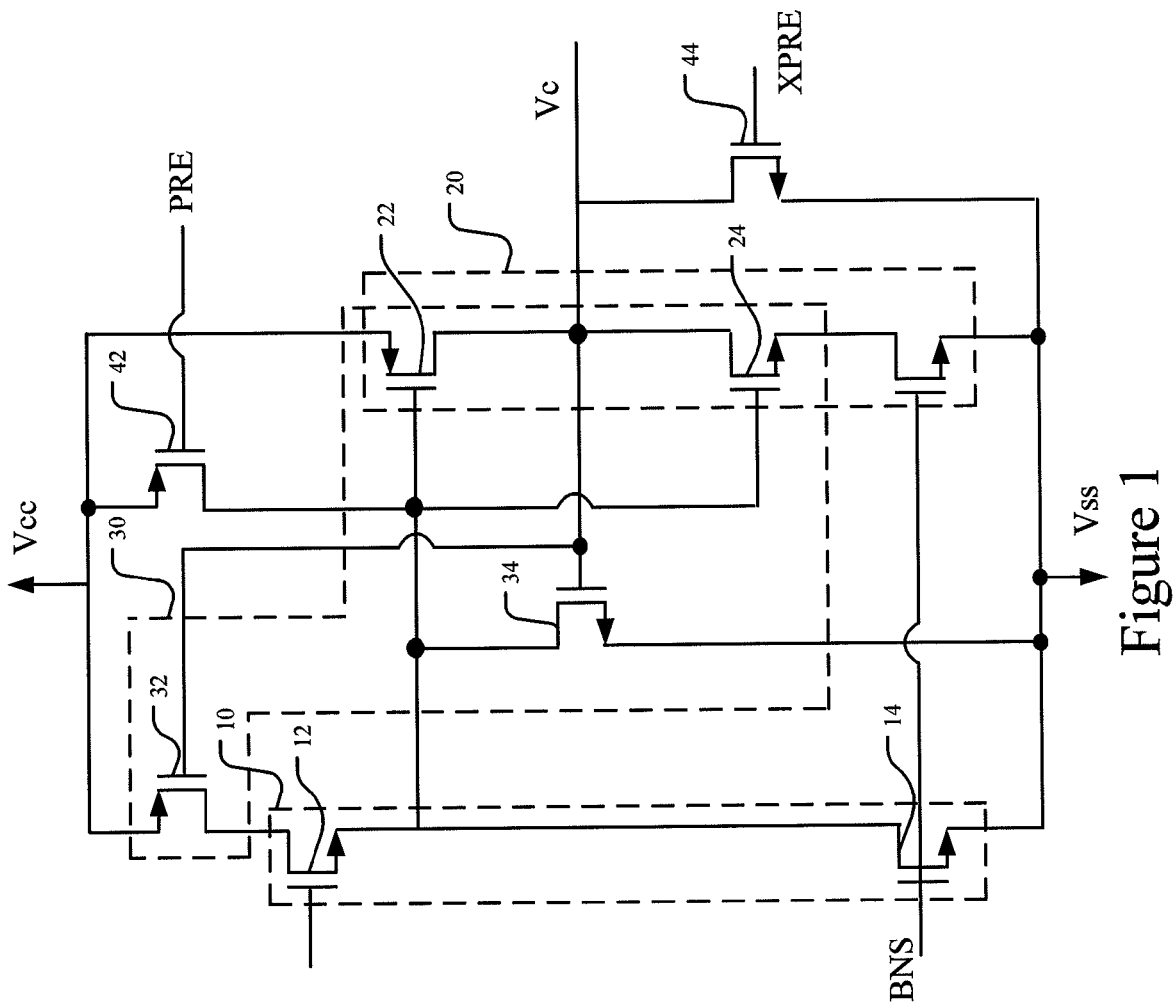
FIG. 1 shows a circuit diagram of the start-up circuit according an embodiment of the present invention.

FIG. 1 shows a circuit diagram of the start-up circuit according an embodiment of the present invention. As shown in the figure, the start-up circuit 1 according to the present invention is used for starting up a variable power supply (not shown in the figure). The start-up circuit 1 comprises a detection circuit 10 and a transition circuit 20. The detection circuit 10 is used for detecting an output voltage of the variable power supply and producing a detection signal. The transition circuit 20 is coupled to the detection circuit 10. It transits the level of the detection signal and produces a control signal Vc for starting up or cutting off the variable power supply. Thereby, by using the detection circuit 10 and the transition circuit 20 according to the present invention, the problem of incapability in transition can be avoided. In addition, the purpose of low power consumption can be achieved as well.

Besides, the start-up circuit 1 according to the present invention further comprises a latch circuit 30, which is coupled between the detection circuit 10 and the transition circuit 20 for latching the detection signal. Because if the level of the detection signal is unstable during the process of signal transition, the control signal produced by the transition circuit 20 will vary as the detection signal varies. The transition circuit 20 is used for outputting a stable control signal Vc and hence controlling the variable power supply stably. Thereby, the circuit stability can be improved.

Refer again to FIG. 1. The detection circuit 10 according to the present invention comprises a first transistor 12 and a second transistor 14. The first transistor 12 is coupled to a power supply $V_{CC}$ and controlled by the output voltage of the variable power supply. The second transistor 14 is coupled between the first transistor 12 and a reference voltage $V_{SS}$ and controlled by a bias signal BNS. Thereby, the first transistor 12 is turned on or off according to the output voltage of the variable power supply for producing the detection signal.

In addition, the transition circuit 20 according to the present invention comprises a third transistor 22 and a fourth transistor 24. The third transistor 22 is coupled to the power supply $V_{CC}$ and the detection circuit 10. The fourth transistor 24 is coupled between the third transistor 22 and the reference voltage $V_{SS}$. Besides, the gate of the fourth transistor 24 is coupled to the gate of the third transistor 22. Hence, the gates of the third and fourth transistors 22, 24 are coupled together for receiving the detection signal. According to the level of the detection signal, one of the third and fourth transistors 22, 24 will be turned on. The control signal output by the third or the fourth transistor 22, 24 is inverted signal of the detection signal. The transition circuit 20 can be an inverter.

Figure 2:
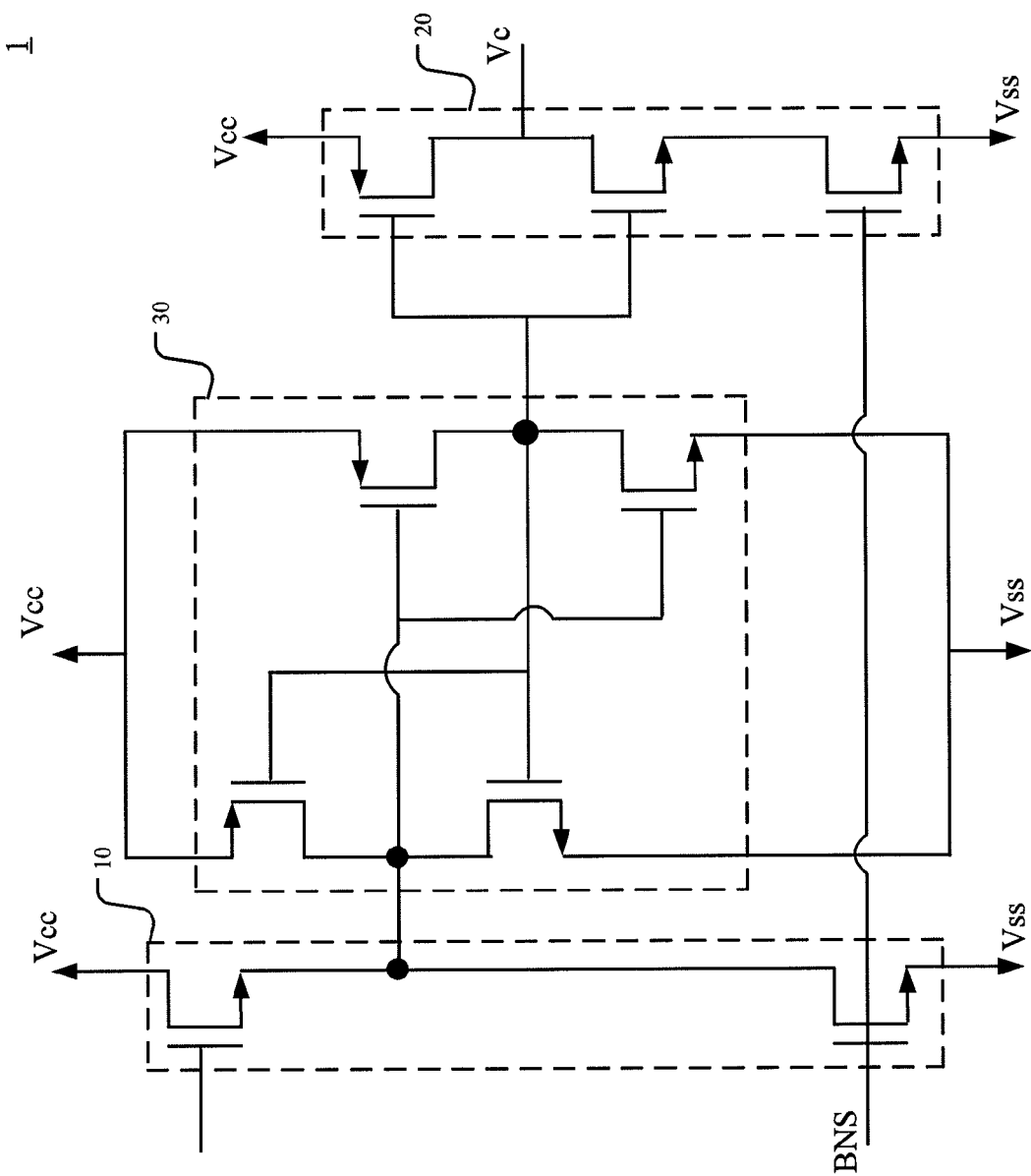
FIG. 2 shows a circuit diagram of the start-up circuit according another embodiment of the present invention.

The latch circuit 30 according to the present invention comprises a fifth transistor 32, a sixth transistor 34, the third transistor 22, and the fourth transistor 24. The fifth transistor 32 is coupled between the power supply $V_{CC}$ and the detection circuit 10. In addition, the gate of the fifth transistor 32 is coupled to an output of the latch circuit 30. The sixth transistor 34 is coupled between the detection circuit 10 the reference voltage $V_{SS}$. The gate of the sixth transistor 34 is coupled to the gate of the fifth transistor 32. The third transistor 22 is coupled to the power supply $V_{CC}$ and the sixth transistor 34. The gate of the third transistor 22 is coupled between the sixth and fourth transistors 34, 24. The fourth transistor 24 is coupled between the third transistor 22 and the reference voltage $V_{SS}$. The gate of the fourth transistor 24 is coupled to the gate of the third transistor 22. Thereby, by using the fifth, the sixth, the third, and the fourth transistors 32, 34, 22, 24, the level of the detection signal is latched for achieving the purpose of improving circuit stability. Furthermore, because the latch circuit 30 according to the present invention uses the third and fourth transistors 22, 24 of the transition circuit 20 as a part of its own circuitry, the circuit area, and hence the cost, can be saved. Nonetheless, the above description is an embodiment of the latch circuit 30 according to the present invention. The present invention is not limited to the embodiment. It is also possible to purely integrate the detection circuit 10, the transition circuit 20, and the latch circuit 30 to form the start-up circuit, as shown in FIG. 2. This is well known to a person having ordinary skill in the art. Thereby, the details will not be described further.

Besides, the first, second, third, fourth, fifth, and sixth transistors 12, 14, 22, 24, 32, 34 according to the present embodiment are field-effect transistors.

The start-up circuit 1 according to the present invention further comprises a first reset switch 42 and a second reset switch 44. The first reset switch 42 is coupled between the power supply $V_{CC}$ and the latch circuit 30; the second reset switch 44 is coupled to an output of the transition circuit 20. Thereby, by using the first and second reset switches 42, 44 according to the present invention, the start-up circuit 1 can be reset.

Figure 3:
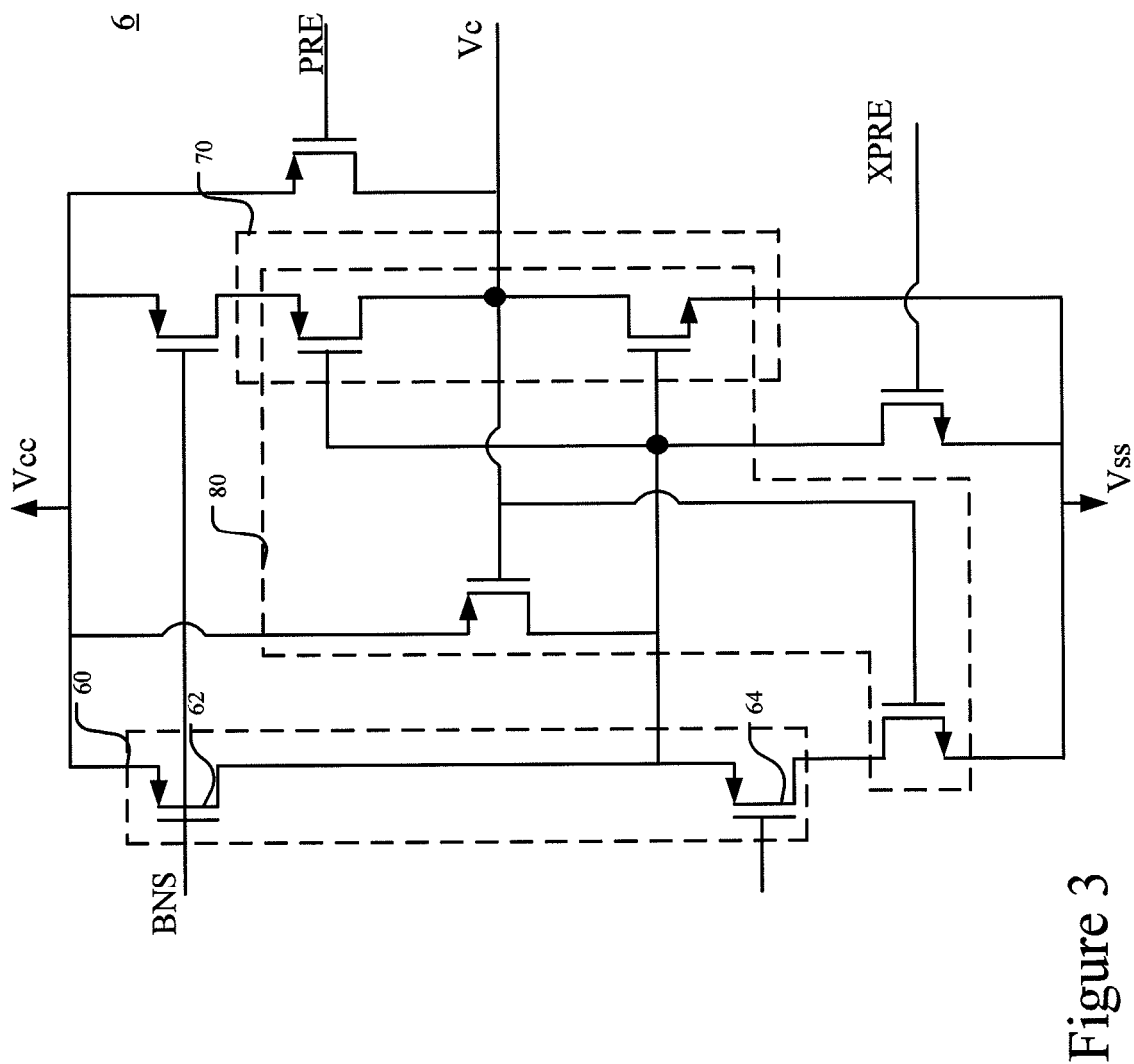
FIG. 3 shows a circuit diagram of the start-up circuit according another embodiment of the present invention.

FIG. 3 shows a circuit diagram of the start-up circuit according another embodiment of the present invention. As shown in the figure, the start-up circuit 6 according to the present embodiment comprises a detection circuit 60, a transition circuit 70, and a latch circuit 80. The detection circuit 60 is used for producing the detecting signal. The transition circuit 70 receives the detection signal produced by the detection circuit 60 and transits the detection signal for producing the control signal. The latch circuit 80 is coupled between the detection circuit 60 and the transition circuit 80 for latching the detection signal. The difference between the start-up circuit 6 according to the present embodiment and the start-up circuit 2 according to the embodiment in FIG. 1 is that the transistor types of the former are opposite to those of the latter. For example, the transistors 12, 14 of the detection circuit 10 in FIG. 1 are both N-type field-effect transistors; the transistors 62, 64 of the detection circuit 60 according to the present embodiment are both P-type field-effect transistors. Likewise, the transistor types of the transition circuit 20 and the latch circuit 30 in FIG. 1 are all opposite to those of the transition circuit 70 and the latch circuit 80 according to the present embodiment. This is well known to a person having ordinary skill in the art. Hence, the details will not be described further.

Figure 4:
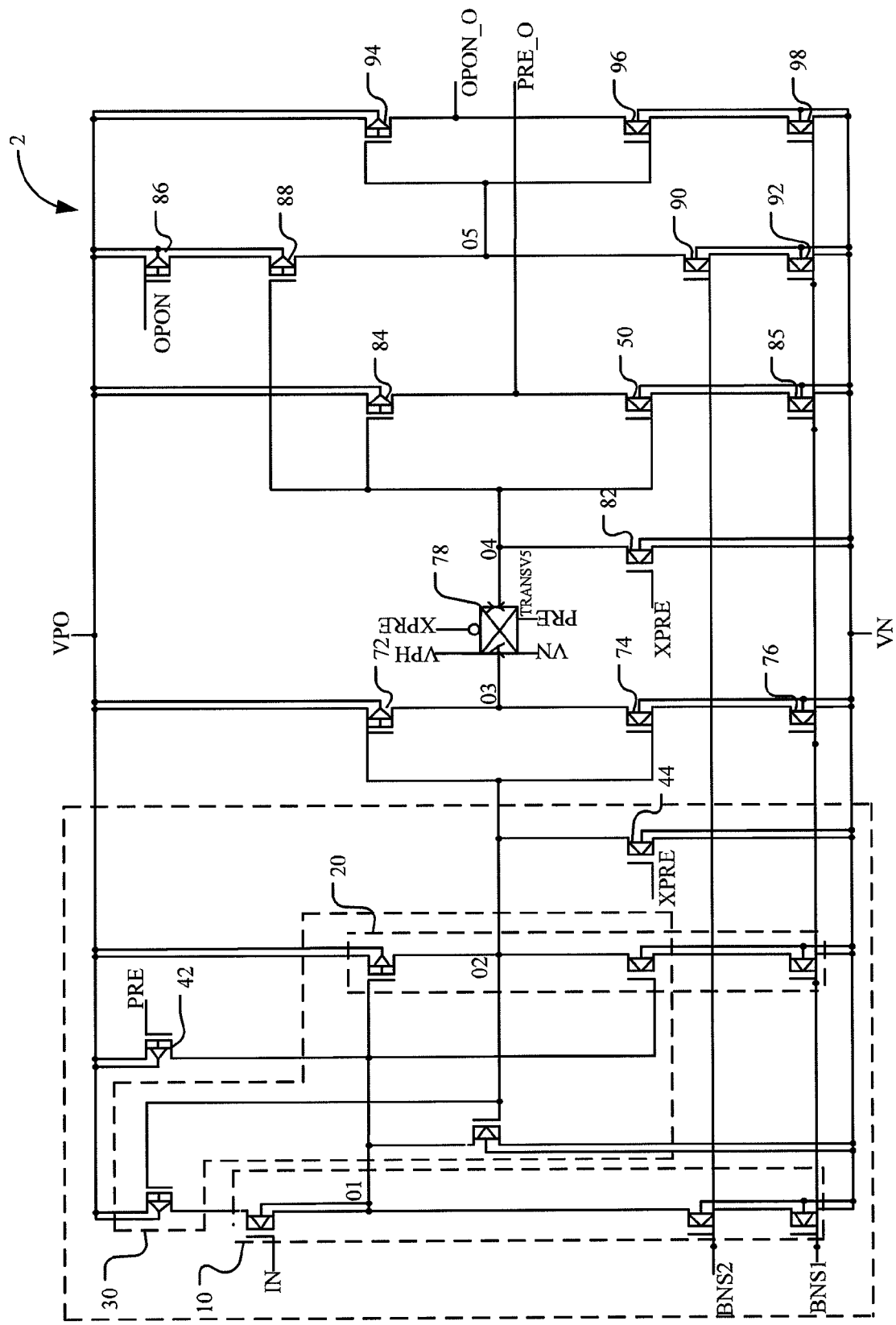
FIG. 4 shows a circuit diagram of the start-up circuit applied to a driving circuit according an embodiment of the present invention.

FIG. 4 shows a circuit diagram of the start-up circuit applied to a driving circuit according an embodiment of the present invention. As shown in the figure, the start-up circuit 1 can be applied to a driving circuit 2, which, in turn, can be applied to driving a LCD panel. The driving circuit 2 comprises a transistor 72, a transistor 74, a transistor 76, a transmission gate 78, a transistor 82, a transistor 84, a transistor 50, a transistor 85, a transistor 86, a transistor 88, a transistor 90, a transistor 92, a transistor 94, a transistor 96, and a transistor 98. The transistors 72, 74 form an inverter; the transistors 76, 85, 98 form a current source; the transistor 82 is a reset switch; the transistors 84, 50 form an inverter; the transistors 86, 88, 90, 92 form an OR gate; and the transistors 94, 96 form an inverter. A terminal of the transistor 72 is coupled to the power supply $V_{CC}$; a terminal of the transistor 74 is coupled to another terminal of the transistor 72; the gate of the transistor 74 is coupled to the gate of the transistor 72; the transistor 76 is coupled between the transistor 74 and the reference voltage $V_{SS}$ and controlled by the bias signal BNS1. The transmission gate 78 has a first terminal and a second terminal. The first terminal of the transmission 78 is coupled between the transistor 72 and the transistor 74. A terminal of the transistor 82 is coupled to the transmission gate 78. Another terminal of the transistor 82 is coupled to the reference voltage $V_{SS}$. The transistor 82 is controlled by the inverted reset signal XPRE. A terminal of the transistor 84 is coupled to the power supply $V_{CC}$. A terminal of the pre-charge switch 50 is coupled to the transistor 84. The gate of the pre-charge switch 50 is coupled to the gate of the transistor 84. A terminal of the transistor 85 is coupled to the pre-charge switch 50. Another terminal of the transistor 85 is coupled to the reference voltage $V_{SS}$. The transistor 85 is controlled by the bias signal BNS1. A terminal of the transistor 86 is coupled to the power supply $V_{CC}$. A terminal of the transistor 88 is coupled to the transistor 86. The gate of the transistor 88 is coupled to the gate of the transistor 84. A terminal of the transistor 90 is coupled to another terminal of the transistor 88. The transistor 90 is controlled by the bias signal BNS2. A terminal of the transistor 92 is coupled to another terminal of the transistor 90. Another terminal of the transistor 92 is coupled to the reference voltage $V_{SS}$. The transistor 90 is controlled by the bias signal BNS2. A terminal of the transistor 94 is coupled to the power supply $V_{CC}$. A terminal of the transistor 96 is coupled to another terminal of the transistor 94. The gate of the transistor 94 is coupled to the gate of the transistor 96. A terminal of the transistor 98 is coupled to another terminal of the transistor 96. The transistor 98 is controlled by the bias signal BNS1.

The start-up circuit 1 is used for controlling the driving circuit 2 to produce the required control signal. IN other words, the start-up circuit 1 will detects the status of a variable power supply VPO automatically for controlling the driving circuit 2 to produce the required control signal. In the following, the process of the circuit behavior described above will be explained.

Figure 5A:
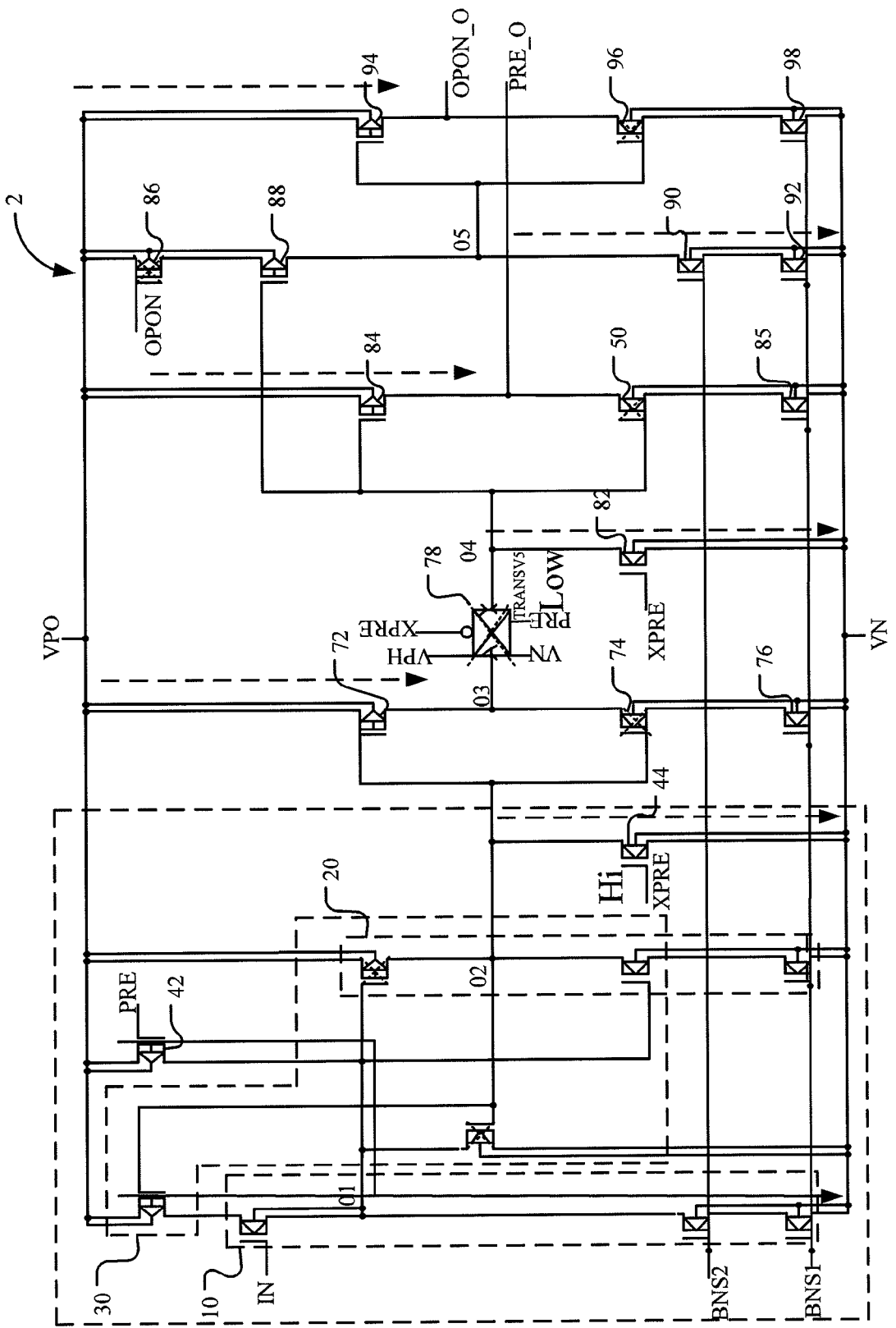
FIG. 5A shows an operational diagram of the start-up circuit applied to a driving circuit according an embodiment of the present invention.
Figure 5B:
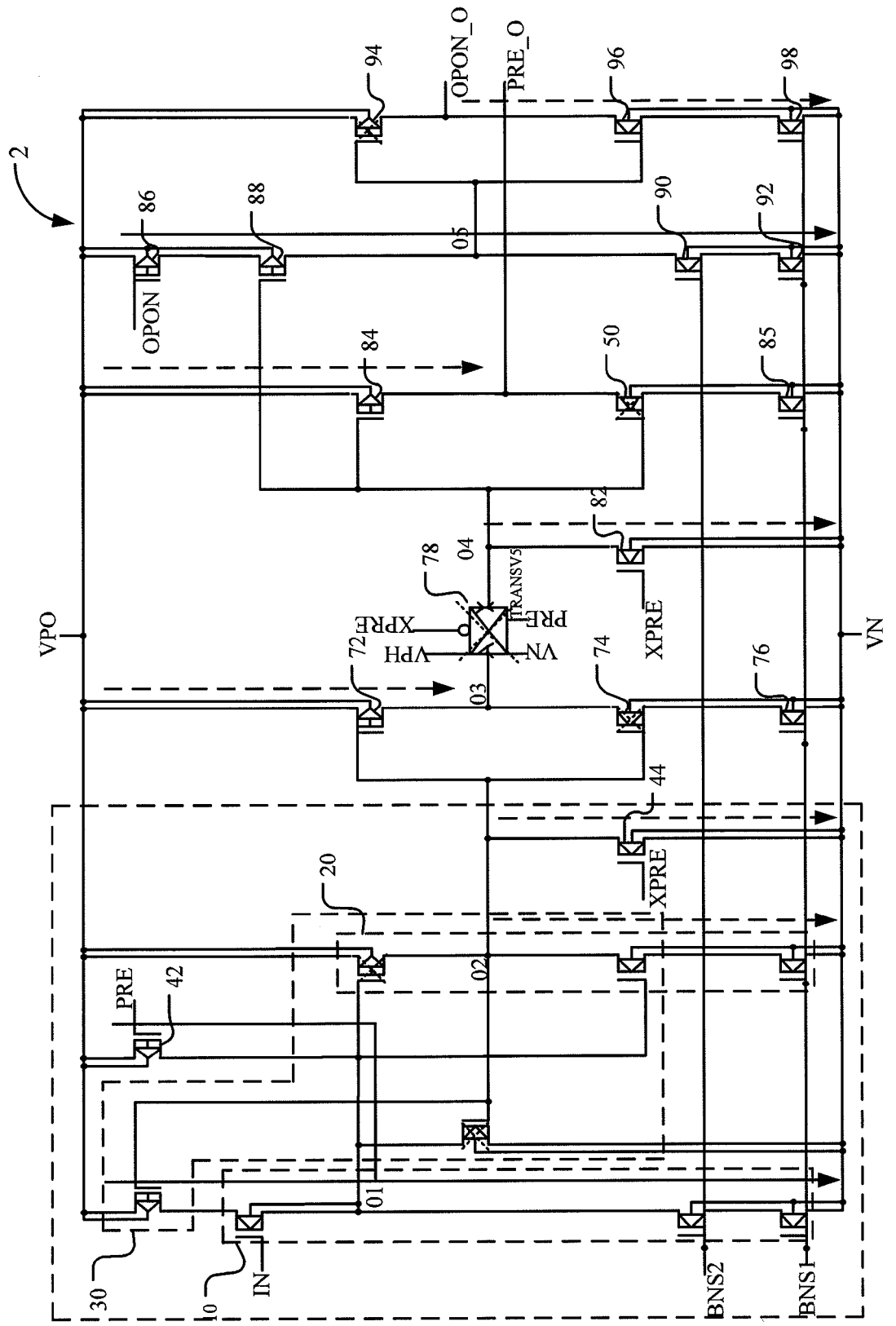
FIG. 5B shows an operational diagram of the start-up circuit applied to a driving circuit according another embodiment of the present invention.

FIGS. 5A to 5D show operational diagrams of the start-up circuit applied to a driving circuit according embodiments of the present invention. As shown in FIG. 5A, the start-up circuit 1 according to the present invention is in the reset status, which means that the first and second reset switches 42, 44 are turned on for resetting the start-up circuit 1. At this time, both of the start-up circuit 1 and the driving circuit 2 don't start operating. That is to say, the output signal OPON_O of the driving circuit 2 produces a low driving voltage. In addition, the driving circuit 2 also outputs a high driving voltage PRE_O.

Figure 5C:
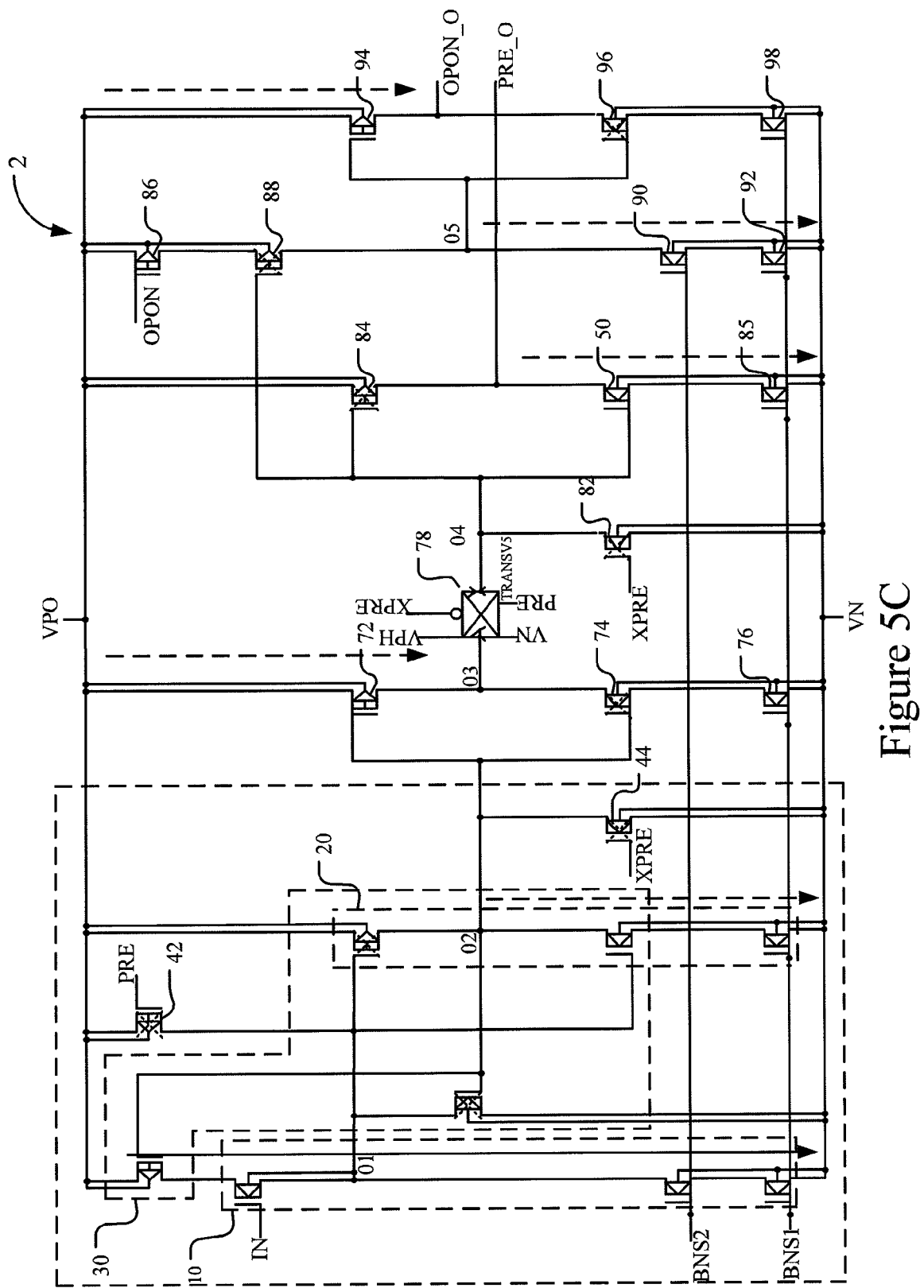
FIG. 5C shows an operational diagram of the start-up circuit applied to a driving circuit according another embodiment of the present invention.

At this moment, the start-up circuit 1 detects the status of a variable power supply VPO automatically and judges according to an output signal IN provided by the variable power supply VPO. When the voltage of the variable power supply is increased and lowered to a threshold value, the start-up circuit 1 produces the control signal for the driving circuit 2 as shown in FIG. 5C. When the detection circuit 10 of the start-up circuit 1 detects that the voltage signal of the variable power supply VPO is less than the output signal IN provided by the variable power supply VPO, the detection circuit 10 will transmit the voltage signal of the variable power supply VPO to the input of the transition circuit 20. Then the transition circuit 20 will compare the voltage levels of the variable power supply VPO and the output signal IN provided by the variable power supply VPO. When the voltage of the variable power VPO is less than the output signal IN provided by the variable power supply VPO by a threshold value, the output signal OPON_O of the driving circuit 2 becomes a high driving voltage. In addition, the driving circuit 2 also outputs a low driving voltage PRE_O.

Figure 5D:
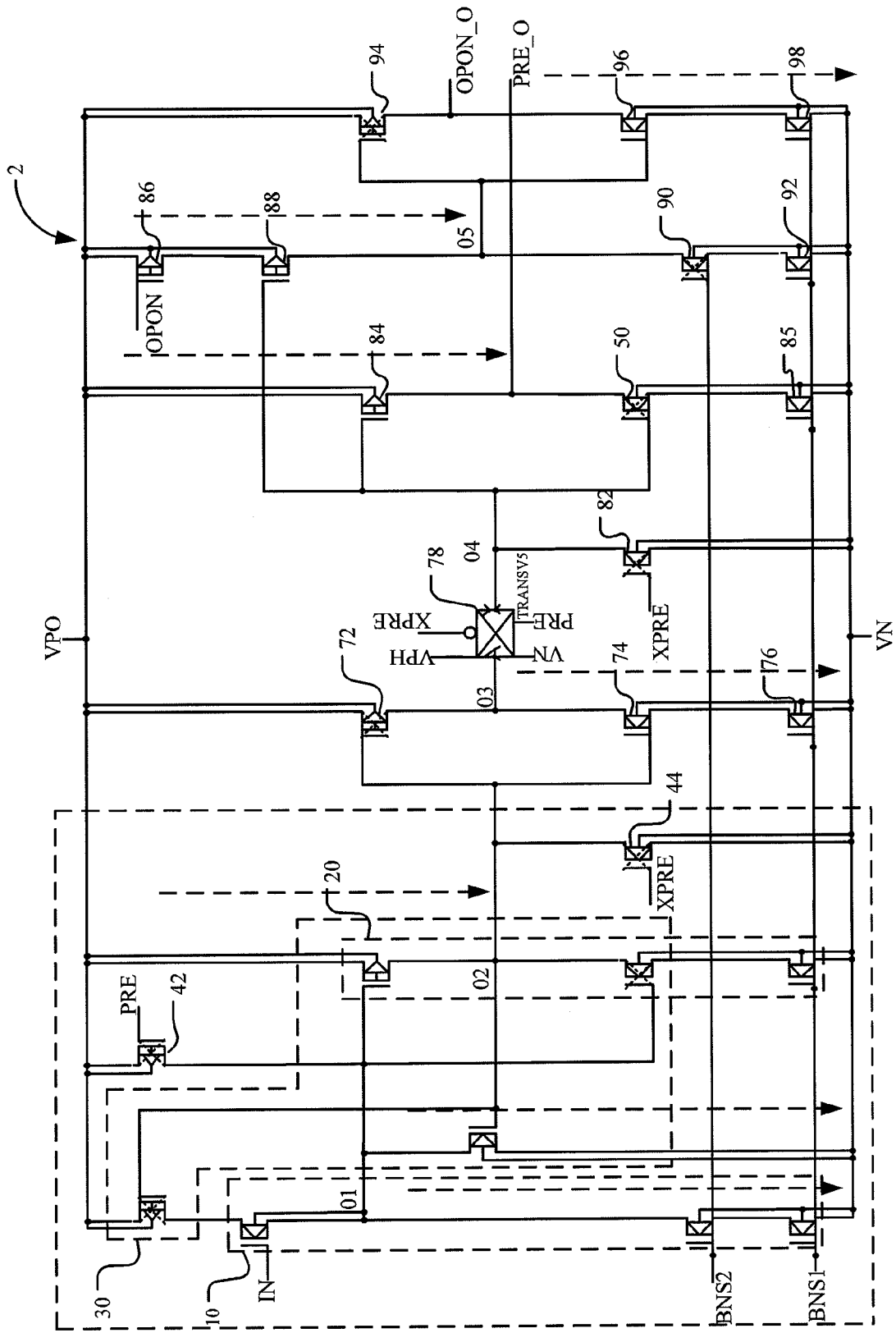
FIG. 5D shows an operational diagram of the start-up circuit applied to a driving circuit according another embodiment of the present invention.

As shown in FIG. 5D, when the voltage of the variable power VPO is higher than the output signal IN provided by the variable power supply VPO by a threshold value, the transition circuit 20 outputs a high voltage to the driving circuit 2. The output signal OPON_O of the driving circuit 2 becomes a low driving voltage. In addition, the driving circuit 2 also outputs a high driving voltage PRE_O.

According to FIGS. 5A to 5D, it is known that by using a detection circuit and a transition circuit according to the present invention, the problem of incapability in transition can be prevented. In addition, the purpose of low power consumption can be achieved as well.

To sum up, the start-up circuit according to the present invention is used for starting up a variable power supply circuit, which comprises a detection circuit and a transition circuit. The detection circuit is used for detecting an output voltage of the variable power supply and producing a detection signal. The transition circuit is coupled to the detection circuit. It transits the level of the detection signal and produces a control signal for starting up or cutting off the variable power supply. Thereby, the problem of incapability in transition can be avoided as well as achieving the purpose of low power consumption.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A start-up circuit, used for starting up a variable power supply circuit, and comprising:
a detection circuit, used for detecting an output voltage of said variable power supply circuit, and producing a detection signal;
a transition circuit, coupled to said detection circuit, transiting the level of said detection signal, and producing a control signal for starting up or cutting off said variable power supply circuit;
a latch circuit coupled between said detection circuit and said transition circuit for latching said detection signal; and
wherein the latch circuit comprises a first transistor coupled between a power supply and said detection circuit, and the gate thereof coupled to an output of said latch circuit; a second transistor coupled between said detection circuit and a reference voltage, and the gate thereof coupled to the gate of said first transistor; a third transistor coupled to said power supply and said second transistor, and the gate thereof coupled between said first transistor and said second transistor; and a fourth transistor coupled between said third transistor and said reference voltage, and the gate thereof coupled to the gate of said third transistor.

2. The start-up circuit of claim 1, wherein said first transistor, said second transistor, said third transistor, and said fourth transistor are field-effect transistors.

3. The start-up circuit of claim 1, wherein said detection circuit comprises:
a first transistor, coupled to said power supply, and controlled by said output voltage of said variable power supply circuit; and
a second transistor, coupled between said first transistor and said reference voltage, and controlled by a bias signal.

4. The start-up circuit of claim 3, wherein said first transistor and said second transistor are field-effect transistors.

5. The start-up circuit of claim 1, wherein said transition circuit comprises:
a first transistor, coupled to said power supply and said detection circuit; and
a second transistor, coupled between said first transistor and said reference voltage, and the gate thereof coupled to the gate of said first transistor.

6. The start-up circuit of claim 5, wherein said first transistor and said second transistor are field-effect transistors.

7. The start-up circuit of claim 1, and further comprising a reset switch coupled between said power supply and said latch circuit for resetting said start-up circuit.

8. The start-up circuit of claim 1, and further comprising a reset circuit coupled between an output of said transition circuit and said reference voltage for resetting said start-up circuit.

* * * * *